United States Patent
Li et al.

(10) Patent No.: US 10,452,935 B2
(45) Date of Patent: Oct. 22, 2019

(54) SPOOFED FACE DETECTION

(71) Applicant: Microsoft Technology Licensing, LLC, Redmond, WA (US)

(72) Inventors: Jinyu Li, Sammamish, WA (US); Fang Wen, Beijing (CN); Yichen Wei, Beijing (CN); Michael John Conrad, Monroe, WA (US); Chun-Te Chu, Bellevue, WA (US); Aamir Jawaid, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/763,619

(22) PCT Filed: Oct. 30, 2015

(86) PCT No.: PCT/CN2015/093334
§ 371 (c)(1),
(2) Date: Mar. 27, 2018

(87) PCT Pub. No.: WO2017/070920
PCT Pub. Date: May 4, 2017

(65) Prior Publication Data
US 2018/0285668 A1    Oct. 4, 2018

(51) Int. Cl.
*G06K 9/00*    (2006.01)
*G06K 9/46*    (2006.01)
*G06K 9/62*    (2006.01)

(52) U.S. Cl.
CPC ..... *G06K 9/00899* (2013.01); *G06K 9/00288* (2013.01); *G06K 9/4642* (2013.01);
(Continued)

(58) Field of Classification Search
CPC ........... G06K 9/00268; G06K 9/00228; G06K 9/00221; G06K 9/00308; G06K 9/00248;
(Continued)

(56) References Cited

U.S. PATENT DOCUMENTS 7,602,942 B2    10/2009    Bazakos et al.
7,835,554 B2    11/2010    Rowe
(Continued)

FOREIGN PATENT DOCUMENTS

CN    101739555 A    6/2010
CN    101964056 A    2/2011
(Continued)

OTHER PUBLICATIONS

"Welcome to the Multispectral Imagery Lab" —Milab, Retrieved From http://community.wvu.edu/thbourlai/, Retrieved on: Dec. 16, 2015, 3 Pages.
(Continued)

*Primary Examiner* — Amir Alavi
(74) *Attorney, Agent, or Firm* — Alleman Hall Creasman & Tuttle LLP (57) ABSTRACT

Examples are disclosed herein that relate to detecting spoofed human faces. One example provides a computing device comprising a processor configured to compute a first feature distance between registered image data of a human face in a first spectral region and test image data of the human face in the first spectral region, compute a second feature distance between the registered image data and test image data of the human face in a second spectral region, compute a test feature distance between the test image data in the first spectral region and the test image data in the second spectral region, determine, based on a predetermined relationship, whether the human face to which the test image data in the first and second spectral regions corresponds is a
(Continued)

real human face or a spoofed human face, and modify a behavior of the computing device.

20 Claims, 4 Drawing Sheets (52) U.S. Cl.
CPC ......... *G06K 9/4652* (2013.01); *G06K 9/6217* (2013.01); *G06K 9/6269* (2013.01); *G06K 2009/4666* (2013.01)

(58) Field of Classification Search
CPC .......... G06K 9/00261; G06K 9/00899; G06K 9/00288; G06K 9/4642; G06K 9/6217; G06K 9/4652; G06K 2009/4666; G07C 9/00
See application file for complete search history.

(56) References Cited

U.S. PATENT DOCUMENTS

| | | | |
|---|---|---|---|
| 8,509,495 B2 | 8/2013 | Xu et al. | |
| 8,587,657 B2 | 11/2013 | Wang et al. | |
| 8,913,118 B2 | 12/2014 | Millikan | |
| 8,924,735 B2 | 12/2014 | Forbes et al. | |
| 9,060,688 B2 | 6/2015 | Rowe | |
| 9,082,235 B2 * | 7/2015 | Lau | G07C 9/00 |
| 9,652,663 B2 * | 5/2017 | Lau | G07C 9/00 |
| 9,672,415 B2 * | 6/2017 | Pfursich | G06K 9/00899 |
| 9,690,998 B2 * | 6/2017 | Negi | G06K 9/00221 |
| 2003/0163710 A1 | 8/2003 | Ortiz et al. | |
| 2008/0212849 A1 | 9/2008 | Gao | |
| 2009/0310828 A1 | 12/2009 | Kakadiaris et al. | |
| 2010/0128938 A1 | 5/2010 | Chung et al. | |
| 2013/0250108 A1 | 9/2013 | Du et al. | |
| 2017/0076474 A1 * | 3/2017 | Fu | G06T 11/00 |
| 2018/0034852 A1 * | 2/2018 | Goldenberg | G06F 21/32 |
| 2018/0089848 A1 * | 3/2018 | Yang | G06T 7/55 |
| 2018/0181794 A1 * | 6/2018 | Benini | G06K 9/00228 |
| 2018/0268205 A1 * | 9/2018 | Jiang | G06K 9/00268 |
| 2018/0285668 A1 * | 10/2018 | Li | G06K 9/00288 |
| 2019/0026544 A1 * | 1/2019 | Hua | G06T 7/194 |

FOREIGN PATENT DOCUMENTS

| | | |
|---|---|---|
| CN | 102024145 A | 4/2011 |
| CN | 102385704 A | 3/2012 |
| CN | 102622588 A | 8/2012 |
| CN | 103324911 A | 9/2013 |
| CN | 103514438 A | 1/2014 |
| CN | 204288308 U | 4/2015 |
| CN | 104751110 A | 7/2015 |
| CN | 104766039 A | 7/2015 |
| CN | 104766063 A | 7/2015 |
| EP | 2711899 A2 | 3/2014 |
| WO | 2010007094 A2 | 1/2010 |
| WO | 2013098708 A2 | 7/2013 |
| WO | 2015040001 A2 | 3/2015 |

OTHER PUBLICATIONS

Bebis, et al., "Face Recognition by Fusing Thermal Infrared and Visible Imagery", in Proceedings of Image and Vision Computing, vol. 24, Issue 7, Jul. 2006, 16 Pages.
Bhowmik, et al., "Thermal Infrared Face Recognition—a Biometric Identification Technique for Robust Security System", In Publication of Intech Open Science, Jul. 27, 2011, 27 Pages.
Chang, et al., "Improving Face Recognition via Narrowband Spectral Range Selection Using Jeffrey Divergence", In Proceedings of IEEE Transactions on Information Forensics and Security, vol. 4, Issue 1, Mar. 2009, 12 Pages.
Chen, et al., "Bayesian Face Revisited a Joint Formulation", In Proceedings of the 12th European Conference on Computer Vision, vol. Part III, Oct. 7, 2012, 14 Pages.
Dowdalla, et al., "Face Detection in the Near-IR Spectrum", In Journal of Image and Vision Computing, vol. 21, Issue 7, Jul. 1, 2003, 14 Pages.
Galbally, et al., "Biometric Antispoofing Methods: A Survey in Face Recognition", In Proceedings of IEEE Access, vol. 2, Dec. 18, 2014, 23 Pages.
Li, et al., "Illumination Invariant Face Recognition Using Near-Infrared Images", In Proceedings of IEEE Transactions on Pattern Analysis and Machine Intelligence, vol. 29, Issue 4, Apr. 2007, 13 Pages.
Michel, et al., "In Vivo Measurement of Mid-Infrared Light Scattering from Human Skin", In Journal of Biomedical Optics Express, vol. 4, Issue 4, Apr. 1, 2013, 11 Pages.
Min, et al., "Kinect Face DB: A Kinect Database for Face Recognition", In Proceedings of IEEE Transactions on Systems, Man, and Cybernetics Systems, vol. 44, Issue 11, Nov. 2014, 15 Pages.
Park, et al., "Multispectral Imaging Using Multiplexed Illumination", In Proceedings of IEEE 11th International Conference on Computer Vision, Oct. 14, 2007, 8 Pages.
Parveen, et al., "Face Anti-Spooling Methods", In Proceedings of Current Science, vol. 108, Issue 8, Apr. 25, 2015, 11 Pages.
"International Search Report & Written Opinion issued in PCT Application No. PCT/CN2015/093334", dated Jul. 21, 2016, 12 Pages.
Steiner, et al., "Design of an Active Multispectral SWIR Camera System for Skin Detection and Face Verification", In Journal of Sensors, Mar. 2015, 16 Pages.
"Supplementary Search Report Issued in European No. 15906983.0", dated Apr. 24, 2019, 9 Pages.
Chingovska, et al., "Face Recognition Systems Under Spoofing Attacks", in Proceedings of Face Recognition Across the Imaging Spectrum, Feb. 13, 2016, pp. 165-194.
Martin, et al., "Recent Advances on Face Recognition Using Thermal Infrared Images", In Proceedings of Reviews. Refinements and New Ideas in Face Recognition, Jul. 27, 2011, pp. 95-112.
"First Office Action and Search Report Issued in Chinese Patent Application No. 201580070912.9", dated Jul. 3, 2019, 11 Pages.

* cited by examiner

SPOOFED FACE DETECTION

CROSS REFERENCE TO RELATED APPLICATIONS

The present application is a U.S. National Phase of International Patent Application Serial No. PCT/CN2015/093334, entitled "SPOOFED FACE DETECTION", filed Oct. 30, 2015, the entire contents of which is hereby incorporated by reference for all purposes.

BACKGROUND

In many computing environments, user authentication is performed to ensure that certain computing resources are accessed only by authorized users. Facial recognition is one technique for performing user authentication. An instant image of a human face may be compared to previously captured images of human faces to determine or verify the identity to which the human face in the instant image corresponds, for example.

SUMMARY

Examples are disclosed herein that relate to detecting spoofed human faces. One example provides a computing device comprising a processor configured to compute a first feature distance between registered image data of a human face in a first spectral region and test image data of the human face in the first spectral region, compute a second feature distance between the registered image data and test image data of the human face in a second spectral region, compute a test feature distance between the test image data in the first spectral region and the test image data in the second spectral region, determine, based on a predetermined relationship, whether the human face to which the test image data in the first and second spectral regions corresponds is a real human face or a spoofed human face, and modify a behavior of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, facial recognition is one mechanism for performing user authentication. In some facial recognition systems, an instant image of a human face may be compared to previously captured images of the human face to determine or verify the identity to which the human face in the instant image corresponds. However, some such facial recognition systems are vulnerable to spoofing, in which a real human face is simulated by a fake face to fool the facial recognition system. Spoofing may occur in a variety of manners—for example, a nefarious user may present a printed image of a human face, or a three-dimensional model such as a face mold, to an image capture device to achieve user authentication as a different user. If the spoofing technique fools the facial recognition system, a nefarious user can gain unauthorized access to computing resources and/or data.

Figure 1:
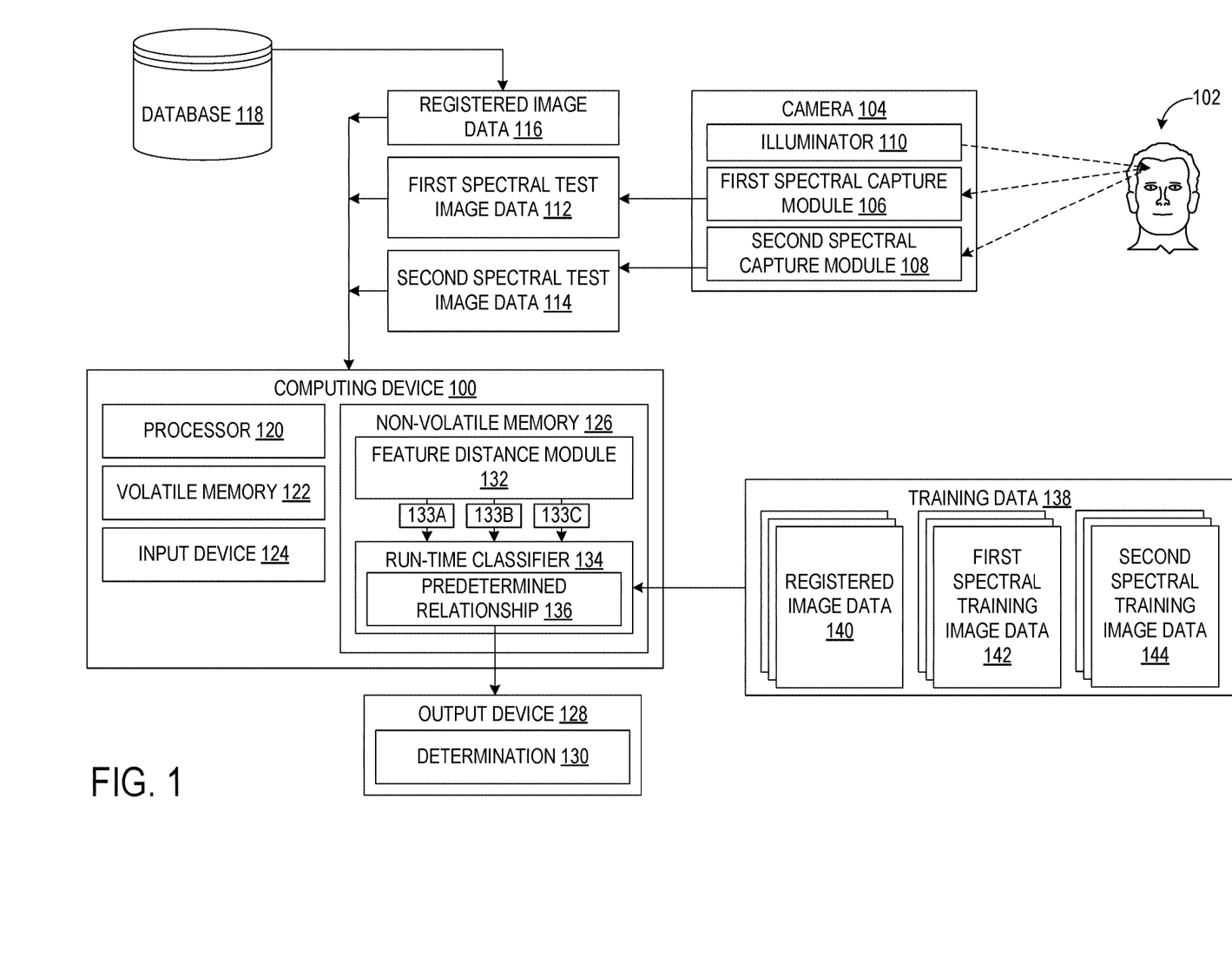
FIG. 1 schematically depicts an example computing device.

To address these issues, devices and methods described below for detecting spoofed human faces are provided. FIG. 1 schematically depicts a computing device 100 for performing biometric verification of a user 102. In particular, computing device 100 may determine whether image data captured by a camera 104 corresponds to a real human face of user 102 presented via the physical presence of the user, or whether the image data corresponds to a spoofed face printed on paper, presented on a three-dimensional model, or spoofed in some other manner. As such, references made herein to image data of a user's face may also refer to image data of a spoofed face of the user.

Camera 104 may be a multispectral camera operable to capture image data in two or more regions of the electromagnetic spectrum. As such, camera 104 may include a first spectral capture module 106 operable to capture image data in a first spectral region of the electromagnetic spectrum, and a second spectral capture module 108 operable to capture image data in a second spectral region of the electromagnetic spectrum. The first and second spectral regions may correspond to any suitable regions of the electromagnetic spectrum, such as an infrared spectral region (e.g., 800-1800 nm) and a visible spectral region (e.g., 400-700 nm), respectively, two different regions of the visible spectrum, or two different regions of the non-visible spectrum. Further, the first and second spectral regions may be chosen such that the respective outputs of first and second spectral capture modules 106 and 108 exhibit detectable differences. These differences may be characteristic of human skin, and as such may be unreproducible by spoofing objects not comprised of human skin. The differences may result at least in part from subsurface scattering of light by human skin, which may cause a detectable color and/or brightness difference between visible and infrared image data, in one example.

First and second spectral capture modules 106 and 108 are hardware modules that may be implemented in any suitable manner. In one example, first and second spectral capture modules 106 and 108 may comprise distinct, respective photosensitive surfaces each comprised of suitable materials that facilitate their sensitivity to the desired wavelengths. In another example, first and second spectral capture modules 106 and 108 may be implemented in a common photosensitive surface above which filtration optics separate and route first and second spectral light to respective areas of the photosensitive surface. In yet another example, a common photosensitive surface may receive first and second spectral light and produce output based on the first and second spectral light, where processing of the output creates separate first and second spectral image data. First and second spectral capture modules 106 and 108 may comprise any suitable image sensing technologies, including but not limited to charge-coupled device (CCD) and complementary metal-oxide-semiconductor (CMOS) technologies, for example.

Camera 104 may include an illuminator 110 for illuminating user 102. A portion of the light produced by illuminator 110 and reflected from the face of user 102 may be captured by first and second spectral capture modules 106 and 108 to image the user's face. Illuminator 110 may assume any suitable form, including but not limited to that of an optical assembly comprising a diffuser and a light emitting diode (LED), and may be configured to emit light in any suitable spectral region. A spectral region such as infrared may be chosen in view of the reflectance and scattering properties of human skin and/or to maximize signal-to-noise ratio (SNR), for example. Further, in some examples the light output of illuminator 110 may be modulated—e.g., spatially and/or temporally, which may enable camera 104 to sense depth. Alternatively or additionally, light emitted by illuminator 110 may be polarized (e.g., linearly, circularly), for example to reduce glint/glare produced by specular reflective surfaces. While a single illuminator 110 is depicted in FIG. 1, two or more illuminators are contemplated, which may or may not differ in their output of light.

Image data produced by camera 104, along with previously stored image data of user 102, may be used to determine whether the user's face as perceived by the camera is real or spoofed. As such, FIG. 1 shows test image data 112 of the user's face in the first spectral region, produced based on light captured by first spectral capture module 106, test image data 114 of the user's face in the second spectral region, produced based on light captured by second spectral capture module 108, and previously stored registered image data 116 of the user's face in the first spectral region being fed to computing device 100 where biometric verification may take place. The correspondence of registered image data 116 to the real face of user 102, and not a spoofed face of the user, may have been verified, and an identity of the user may have been associated with the registered image data. Registered image data 116 may thus provide a verified reference against which to test first and second test image data 112 and 114 for spoofing.

FIG. 1 shows registered image data 116 obtained from a database 118 of registered human face image data. Database 118 may store verified human face image data for a plurality of users, and may further store an identity for each user. When configured in such a manner, database 118 may partially facilitate detection of identity spoofing for each user in the database. Further, via the association of a verified identity with each user, database 118 may partially facilitate identity verification for each user in the database. Registered human face image data stored in database 118 may correspond to any suitable spectral region(s)—in one example, the registered image data may correspond to the first spectral region.

Computing device 100 may include or be coupled to one or more of a processor 120, volatile memory 122 (e.g., random access memory), an input device 124 (e.g., keyboard, mouse, game controller, joystick, touch sensor, microphone), non-volatile memory 126, and an output device 128 (e.g., display, speaker). Computing device 100 may assume any suitable form, including but not limited to a desktop computer, laptop computer, tablet computer, smartphone, smart screen, console computing device, head mounted display device, etc.

Output device 128 may output a determination 130 as to whether first and second test image data 112 and 114 correspond to a real human face or a spoofed human face. Computing device 100, and/or other devices, may take various actions on the basis of determination 130, such as permitting or denying access to secured computing resources and/or data, displaying a graphical user interface (e.g., on output device 128) indicating whether user authentication passed or failed, etc. "Secured data" as used herein may refer to data to which access is controlled on the basis of determination 130—e.g., access to secured data may be permitted when a human face is determined to be a real human face, and denied when the human face is determined to be a spoofed human face. Secured data may be encrypted or non-encrypted.

Non-volatile memory 126 may include a feature distance module 132, which is a software program for computing a feature distance between features (or data structures including features) extracted from image data. As described in further detail below, "feature" may refer to a wide variety of data types that can be extracted from image data and used to represent the content therein. By computing the distance between features, an assessment of the similarity of image data sets represented by the features can be determined. FIG. 1 shows how feature distance module 132 may compute a first feature distance 133A between registered image data 116 of the human face of user 102 in the first spectral region and test image data 112 of the user's human face in the first spectral region, a second feature distance 133B between the registered image data and second test image data 114 of the user's face in the second spectral region, and a test feature distance 133C between the test image data in the first spectral region and the test image data in the second spectral region.

Feature distances computed by feature distance module 132 may be supplied to a run-time classifier 134 configured to differentiate between real human face image data and spoofed human face image data classes. As part of training of classifier 134, a predetermined relationship 136 for differentiating between real human face image data and spoofed human face image data may be derived. Determination 130 may be generated by supplying feature distances 133A-C to predetermined relationship 136—for example, as described in further detail below with reference to FIG. 2, the determination may be made based on whether or not a linear combination of the feature distances 133A-C exceeds or falls below a threshold specified by the predetermined relationship.

Run-time classifier 134 may be trained with training data 138. Training data 138 may include data sets of the same type as those used to assess spoofing of the face of user 102. To this end, training data 138 may include a registered training image data set 140, a test training image data set 142 in the first spectral region, and a test training image data set 144 in the second spectral region. Registered training image data set 140 may include image data corresponding to real human faces, and not spoofed human faces. Conversely, first and second test training image data sets 142 and 144 may include a subset of image data corresponding to real human faces, and a subset of image data corresponding to spoofed human faces. The inclusion of spoofed and non-spoofed image data in training data 138 may enable the identification of spoofed and non-spoofed human face image data classes. With training data 138 configured in such a manner, run-time classifier 134 may be trained to distinguish between spoofed and non-spoofed human face image data real time. An example method of training classifier 134 is described below with reference to FIG. 4.

Training data 138 may be stored as triples of subsets of data sets 140, 142, and 144. Using images as an example representation, a triple of a registered image, a test training image in the first spectral region, and a test training image in the second spectral image, all of a given user, may be stored for the given user. In such a configuration, training data 138 may comprise a plurality of triples of registered, first test training, and second test training image data subsets each associated with a respective user. Training data 138 may be stored and represented in any suitable manner, however, and in some examples two or more triples may be associated with the same user.

The image data described herein—e.g., image data produced by camera 104, image data in training data 138—may assume any suitable form. In some implementations, such image data may take the form of face images encoded in any suitable format (e.g., bitmap), extracted features (e.g., textures, binary patterns, edges, points, shapes), feature vectors, etc.

Figure 2:
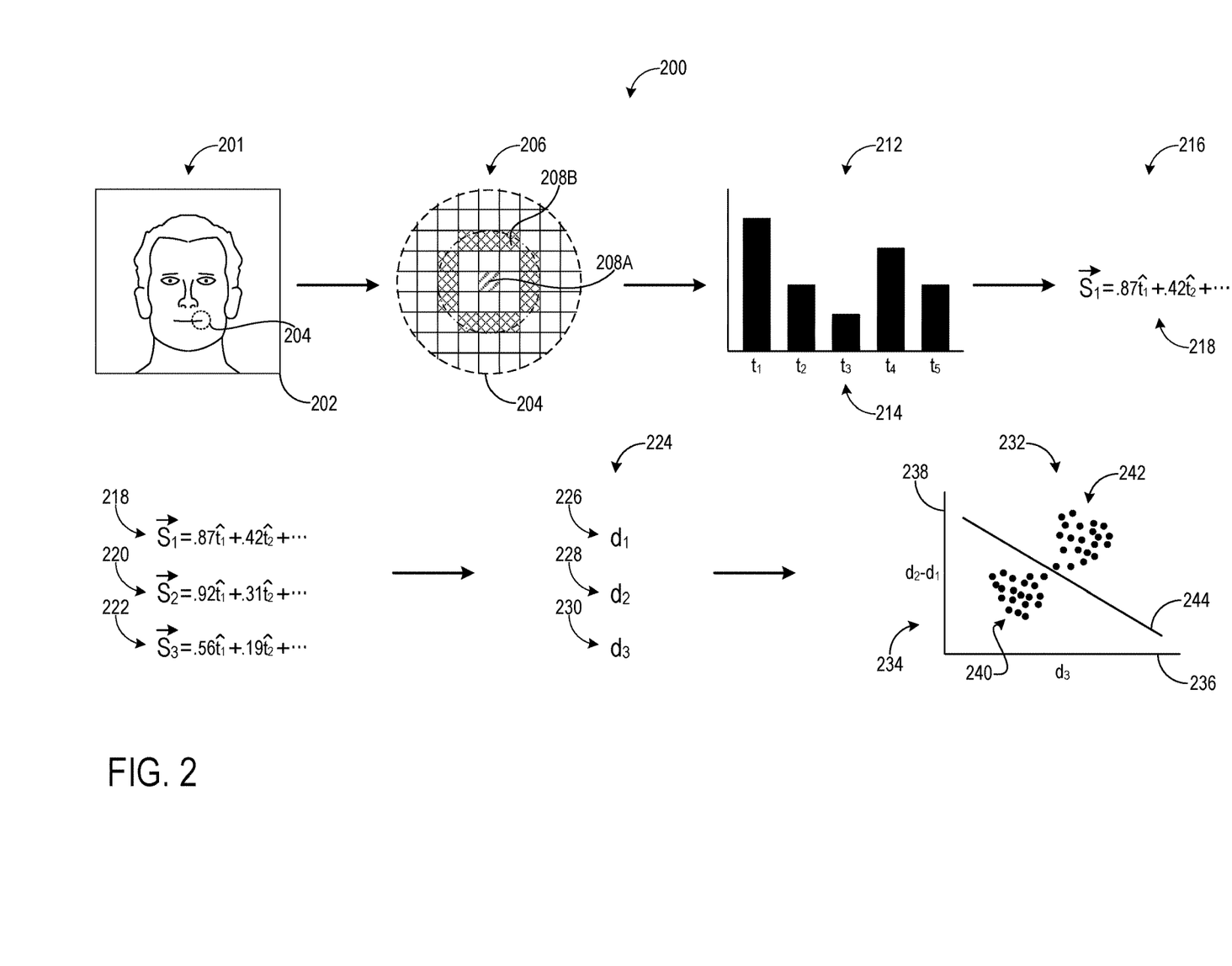
FIG. 2 shows a flow diagram illustrating an example process for training run-time classifier.

FIG. 2 shows a flow diagram illustrating an example process 200 for training run-time classifier 134 with training data 138. Reference to FIG. 1 is made throughout the description of FIG. 2. For clarity, process 200 is described in connection with local binary patterns (LBPs), though any suitable features and method of feature extraction may be used.

Process 200 may include, at 201, receiving registered training image data from registered training image data set 140. For illustrative purposes, the registered training image data is depicted in FIG. 2 as a registered training image 202, but may assume any suitable form as described above. Image 202 includes image data whose correspondence to a real human face is verified. A plurality of regions of interest (ROIs) such as ROI 204 may be identified in image 202. Generally, each ROI may correspond to a region in image data where an extractable feature is known or expected to reside. The feature may be useful for subsequent analysis, and may potentially provide data unique to the image data from which it is extracted. In the example depicted in FIG. 2, ROI 204 corresponds to a corner of the mouth of the user in image 202.

Process 200 may include, at 206, performing texture classification in each ROI. FIG. 2 shows texture classification in the form of LBP analysis performed for ROI 204. ROI 204 includes a plurality of pixels, such as a central pixel 208A, that each specify at least one parameter corresponding to the visual content therein. As a non-limiting example, texture classification is described herein with reference to the brightness specified by each pixel, though texture classification may consider any suitable parameter, including two or more parameters (e.g., color, brightness, hue, saturation). While shown as being circular, the geometry of ROI 204 may assume any suitable form, including rectangular, triangular, annular, and non-contiguous geometries.

As per a typical LBP process, the brightness of central pixel 208A at the center of ROI 204 is compared to the respective brightnesses of its neighboring pixels (e.g., neighboring pixel 208B) all at a common radial distance from the central pixel. Twelve neighboring pixels are considered at the example radial distance shown in FIG. 2. If, for a particular neighboring pixel, that neighboring pixel's brightness is greater than the brightness of central pixel 208A, one of two values (e.g., 0) may be associated with that neighboring pixel. If the brightness of the neighboring pixel is less than the brightness of central pixel 208A, the other of the two values (e.g., 1) may be associated with that neighboring pixel. This process may be repeated for the remaining neighboring pixels relative to central pixel 208A, with the numbers for each neighboring pixel collected into a texture value (e.g., a binary number such as 00101100). In some examples, binary numbers may be determined for multiple sets of neighboring pixels each at different radial differences relative to a given central pixel. LBPs may be determined for every pixel in every ROI 204 of image 202 for which LBP can be performed—for example, LBPs may not be determined for edge pixels due to a lack of neighboring pixels.

Process 200 may include, at 212, extracting at least one feature from each of the plurality of ROIs. FIG. 2 shows the extraction from ROI 204 of a feature 214. Feature 214 may assume the form of a histogram that plots the frequency of each texture value (e.g., $t_1$, $t_2$, $t_3$, $t_4$, $t_5$) computed for the ROI 204—e.g., the texture values computed for each applicable pixel in the ROI. Any suitable feature or combination of features may be extracted from the plurality of ROIs, however.

Process 200 may include, at 216, assembling the extracted features into a feature vector. FIG. 2 shows the assembly of all features extracted from the plurality of ROIs into a feature vector 218. Since, in the example depicted in FIG. 2, the features extracted from image 202 are histograms of texture value frequencies, feature vector 218 may assume the form of a vector whose basis vectors each correspond to a respective bin of all bins of the collection of histograms. Each basis vector may be associated with a respective scalar indicating the (e.g., relative) frequency of its corresponding texture value. Feature vector 218 may assume any suitable form, however, which may be determined by the features on which it is based.

Process 200, as shown and described thus far, may be substantially repeated for test training image data corresponding to the same human face represented by the registered training image data from which feature vector 218 was derived. Thus, in some examples substantially the same processing may be performed on each data set in a given triple of training data 138. Process 200 may accordingly include receiving test training image data in the first spectral region from first test training image data set 142, and further receiving test training image data in the second spectral region from second test training image data set 144. In this manner, for each of the registered image data, first test training image data, and second test training image data, a plurality of ROIs may be identified, at least one feature may be extracted from each of the plurality of ROIs, and the extracted features may be assembled into a feature vector. Accordingly, FIG. 2 shows feature vectors 220 and 222 respectively computed for the first and second test training image data.

With feature vectors 218, 220, and 222 assembled for the registered training image data, first test training image data, and second test training image data, respectively, distances between feature vectors may be computed to assess the similarity of the image data from which they are derived. Thus, process 200 may include, at 224, computing a feature distance for each pair of image data sets. FIG. 2 shows a first feature distance 226 computed between feature vector 218 of the registered training image data in the first spectral region and feature vector 220 of the test training image data in the first spectral region, a second feature distance 228 computed between feature vector 218 of the registered training image data and feature vector 222 of the test training image data in the second spectral region, and a third feature distance 230 computed between feature vector 220 of the first test training image data and feature vector 222 of the second test training image data.

Feature distances may be computed in a variety of suitable manners. In one implementation, feature distance computation may be based on a face representation that models both the identity and intra-personal variation (e.g., lighting, pose, expression) of a user—for example, a face x may be represented as $x=\mu+\varepsilon$. Face x may refer to any suitable representation of a face (e.g., facial image, feature(s), feature vector), while $\mu$ and $\varepsilon$ may be independent Gaussian variables respectively representing the identity and intra-personal variation of the face. Face x may be the face of the corresponding user with the mean of a plurality of faces $x_i$ subtracted therefrom. The plurality of faces $x_i$ may be representative of the gamut of human faces, which may enable the emphasis of unique features in face x when subtracted from face x, for example. The plurality of faces $x_i$ may be derived from database 118 or any other suitable source. The variables $\mu$ and $\varepsilon$ may be latent variables that follow two Gaussian distributions $N(0, S_\mu)$ and $N(0, S_\varepsilon)$, respectively. $S_\mu$ and $S_\varepsilon$ may be unknown covariance matrices. Such representation of face x may be referred to as a "face prior".

With the face prior described above, the joint distribution of two faces $x_1, x_2$ may be modeled as a Gaussian distribution with a mean of zero. Face $x_1$ may correspond to one of registered training image data, first test training image data, and second test training image data, and face $x_2$ may correspond to a different one of the registered training image data, first test training image data, and second test training image data, for example. The covariance of the two faces $x_1$, $x_2$ may be expressed as $cov(x_1, x_2)=cov(\mu_1, \mu_2)+cov(\varepsilon_1, \varepsilon_2)$. In terms of a binary Bayesian decision problem, an intra-personal hypothesis $H_I$ that the two faces $x_1, x_2$ belong to the same user, and an extra-personal hypothesis $H_E$ that the two faces $x_1, x_2$ do not belong to the same user, may be tested. Under the $H_I$ hypothesis, the identity pair $\mu_1, \mu_2$ are the same, and their intra-personal variations $\varepsilon_1, \varepsilon_2$ are independent. The covariance matrix of the distribution $P(x_1, x_2|H_I)$ can be derived as $\Sigma_I=[S_\mu+S_\varepsilon, S_\mu; S_\mu, S_\mu+S_\varepsilon]$. Under hypothesis $H_E$, both the identities and intra-personal variations are independent. Thus, the covariance matrix of the distribution $P(x_1, x_2|H_E)$ can be derived as $\Sigma_E=[S_\mu+S_\varepsilon, 0; 0, S_\mu+S_\varepsilon]$. With these conditional joint probabilities, a logarithmic likelihood ratio $r(x_1, x_2)$ can be obtained: $r(x_1, x_2)=\log[(P(x_1, x_2|H_I))/(P(x_1, x_2|H_E))]=x^T_1*Ax_1+x^T_2*Ax_2-2x^T_1*Gx_2$. In this example, $A=(S_\mu+S_\varepsilon)^{-1}-(F+G)$, where $[F+G, G; G, F+G]=[S_\mu+S_\varepsilon, S_\mu; S_\mu, S_\mu+S_\varepsilon]^{-1}$. $S_\mu$ and $S_\varepsilon$ are two unknown covariance matrices which are learned from the corresponding data. In addition to the method described above, other suitable methods of machine learning may be employed, such as by approximation with between-class and within-class covariance matrices used in linear discriminant analysis (LDA). As another non-limiting example, an expectation-maximization-like algorithm may be used to jointly estimate the two matrices.

Continuing with FIG. 2, each feature distance 226, 228, and 230 may be computed as a likelihood ratio of a probability of a respective pair of feature vectors belonging to a real human face and a probability of the respective pair of feature vectors belonging to a spoofed human face. Feature distances for each data set in a plurality of triples of training data 138 may be similarly computed. These feature distances may then be plotted in a two-dimensional feature space for identifying and separating feature distances into two classes respectively corresponding to spoofed human face image data and non-spoofed human face image data.

Process 200 may thus include, at 232, separating the first, second, and third feature distances 226, 228, and 230 into one of a real human face image data class and a spoofed human face image data class. FIG. 2 shows a two-dimensional feature distance space 234 plotting a plurality of feature distance coordinates. A first axis 236 of space 234 plots a range of test feature distances (e.g., third feature distance 230) between corresponding pairs of test training image data of a human face in the first spectral region and test training image data of the human face in the second spectral region. A second axis 238 of space 234 plots a range of differences between corresponding pairs of first feature distances and second feature distances (e.g., first feature distance 226 subtracted from second feature distance 228).

The plurality of feature distance coordinates in feature distance space 234 may each be separated into a real human face image data class 240 and a spoofed human face image data class 242. With the real and spoofed human face image data classes separate, a classifier (e.g., run-time classifier 134) may be trained to differentiate between the real and spoofed image data classes by receiving first, second, and third (e.g., test) feature distances and, based on the feature distances, plotting corresponding feature distance coordinates in space 234 to determine which class the feature distance coordinates, and thus the corresponding image data, belongs. As part of training the classifier, a predetermined relationship 244 (e.g., predetermined relationship 136) may be derived that provides an efficient determination during run-time for determining which class to which image data belongs. Predetermined relationship 244 may be determined according to linear discriminant analysis as described above, and may assume the following example form: $c_1*d_3+c_2*(d_2-d_1)>t$, where $c_1$ and $c_2$ are constants derived from the feature distance coordinates, $d_1, d_2, d_3$ are first, second, and third (e.g., test) feature distances, respectively, and t is a threshold derived from the feature distance coordinates. Accordingly, by virtue of predetermined relationship 244, the classifier may compare a linear combination of first, second, and test (e.g., third) feature distances (e.g., for a given triple) to the threshold t. The classifier may be configured to determine that a human face is a real human face when the comparison exceeds the threshold t, and to determine that the human face is a spoofed human face when the comparison falls below the threshold t.

Other determinations as to whether a human face is spoofed or real may be made alternatively or in addition to the above. For example, the human face to which test image data in the first and second spectral regions corresponds may be determined to be a real human face when the test feature distance (e.g., between feature vectors of the first and second test image data) exceeds a test feature distance threshold. As another example, the human face to which test image data in the first and second spectral regions corresponds may be determined to be a real human face when the second feature distance (e.g., between corresponding registered image data and the second test image data) exceeds the first feature distance (e.g., between the corresponding registered image data and the first test image data).

The above described systems and processes offer the potential advantage of robust facial recognition that is resistant to human face spoofing. As such, a greater degree of security may be afforded to systems that control access on the basis of such facial recognition, with the potential for identity theft reduced.

Figure 3:
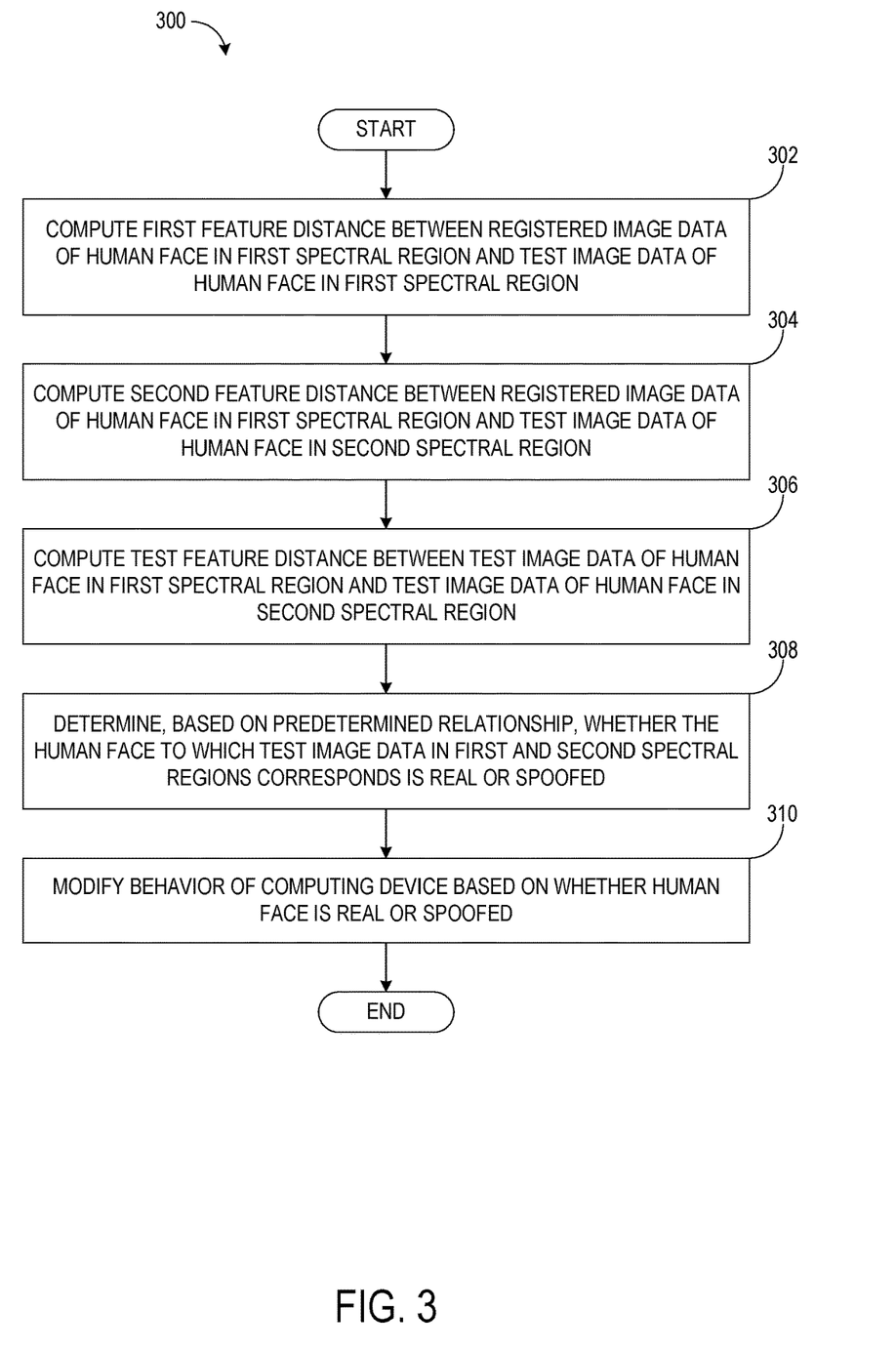
FIG. 3 shows a flowchart illustrating a method of determining whether a human face in image data is a real human face or a spoofed human face.

FIG. 3 shows a flowchart illustrating a method 300 of determining whether a human face in image data is a real human face or a spoofed human face.

Method 300 may include, at 302, computing a first feature distance between registered image data of a human face in a first spectral region and test image data of the human face in the first spectral region. The first feature distance may be computed between respective feature vectors of the registered image data and the first test image data, as described above. The first spectral region may be an infrared spectral region, although alternatively other spectral regions may be used, as described above.

Method 300 may include, at 304, computing a second feature distance between the registered image data of the human face in the first spectral region and test image data of the human face in a second spectral region. The second feature distance may be computed between respective feature vectors of the registered image data and the second test image data, as described above. The second spectral region may be a visible spectral region, although alternatively other spectral regions may be used as the second spectral region, as described above.

Method 300 may include, at 306, computing a test feature distance between the test image data of the human face in the first spectral region and the test image data of the human face in the second spectral region. The test feature distance may be computed between respective feature vectors of the first test image data and the second test image data.

Each feature distance (e.g., first, second, and test feature distances) may be computed as a likelihood ratio of a probability of a respective pair of feature vectors belonging to the real human face and a probability of the respective pair of feature vectors belonging to the spoofed human face. The feature vectors may be computed based on local binary pattern analysis, as one example, or via another suitable process. Computing the first, second, and test feature distances may include computing a respective pair of feature vectors, each feature vector encoding, for corresponding image data, one or more of a histogram of texture values, an edge, a point, a shape, and a brightness.

Method 300 may include, at 308, determining, based on a predetermined relationship differentiating between real human face image data and spoofed human face image data, whether the human face to which the test image data in the first and second spectral regions corresponds is a real human face or a spoofed human face. The predetermined relationship may be determined by training a classifier (e.g., classifier 134 of FIG. 1) to differentiate between real human face image data and spoofed human face image data classes in a two-dimensional feature space (e.g., space 234 of FIG. 2). As one example, a first axis of the two-dimensional feature distance space may plot a range of test feature distances, while a second axis of the two-dimensional feature space may plot a range of differences between corresponding pairs of first and second feature distances.

The predetermined relationship may compare a linear combination of the first, second, and test feature distances to a threshold. The classifier may be configured to determine that the human face is a real human face when the comparison exceeds the threshold, and to determine that the human face is a spoofed human face when the comparison falls below the threshold. It may be determined that the human face to which the test image data in the first and second spectral regions corresponds is the real human face when the test feature distance exceeds a threshold. Further, it may be determined that the human face to which the test image data in the first and second spectral regions corresponds is the real human face when the second feature distance exceeds the first feature distance. An example method of training the classifier is described below with reference to FIG. 4.

Method 300 may include, at 310, modifying a behavior of a computing device (e.g., computing device 100 of FIG. 1) based on whether the human face is determined to be the real human face or the spoofed human face. Modifying the behavior of the computing device may include permitting access to secured data when the human face is determined to be the real human face, and denying access to secured data when the human face is determined to be the spoofed human face, for example. Other modifications to the behavior of the computing device may include permitting or denying access to computing resources, and/or supplying the determination made at 308 to an output device (e.g., output device 128), which may include displaying a graphical user interface (e.g., on the output device) indicating whether user authentication passed or failed, for example. Any suitable modifications to the behavior of the computing device may be made, however. Further, it will be appreciated that the techniques described herein may be combined with other security techniques to enable multifactor authentication of the user prior to permitting access to the secured data.

Figure 4:
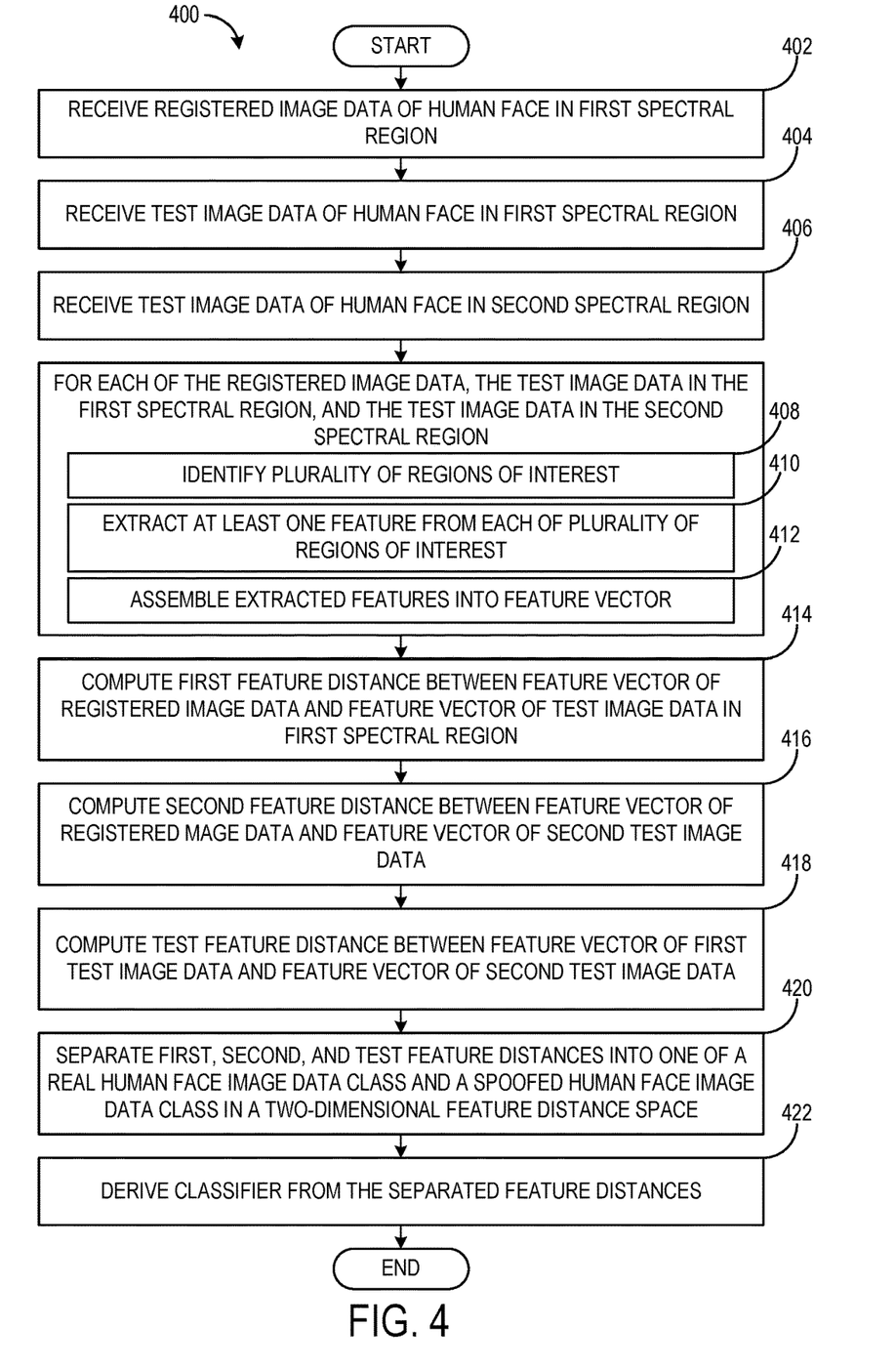
FIG. 4 shows a flowchart illustrating a method of deriving a classifier for differentiating between real human face image data and spoofed human face image data.

FIG. 4 shows a flowchart illustrating a method 400 of deriving a classifier for differentiating between real human face image data and spoofed human face image data.

Method 400 may include, at 402, receiving registered image data of a human face in a first spectral region, at 404, receiving test image data of the human face in the first spectral region, and at 406, receiving test image data of the human face in a second spectral region.

For each of the registered image data, the test image data in the first spectral region, and the test image data in the second spectral region, method 400 may include, at 408, identifying a plurality of regions of interest, at 410, extracting at least one feature from each of the plurality of regions of interest, and, at 412, assembling the extracted features into a feature vector.

Method 400 may include, at 414, computing a first feature distance between the feature vector of the registered image data and the feature vector of the test image data in the first spectral region.

Method 400 may include, at 416, computing a second feature distance between the feature vector of the registered image data and the feature vector of the test image data in the second spectral region.

Method 400 may include, at 418, computing a test feature distance between the feature vector of the test image data in the first spectral region and the feature vector of the test image data in the second spectral region.

Method 400 may include, at 420, separating the first, second, and test feature distances into one of a real human face image data class and a spoofed human face image data class in a two-dimensional feature distance space.

Method 400 may include, at 422, deriving a classifier from the separated feature distances, the classifier configured to differentiate between real human face image data and spoofed human face image data.

The above described methods illustrated in FIGS. 3 and 4 and the process illustrated in FIG. 2 may be implemented on the hardware and software described in relation to FIG. 1, or in another suitable hardware and software environment.

It will be appreciated that the computing device 10 illustrated in FIG. 1 and described herein may take the form of one or more personal computers, server computers, tablet computers, home-entertainment computers, network computing devices, gaming devices, mobile computing devices, mobile communication devices (e.g., smart phone), and/or other computing devices.

Each such computing device includes a processor, volatile memory, and non-volatile memory, as well as a display, input device, and communication system configured to enable the computing device to communicate with other devices via a computer network.

The processor of each computing device is configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processor of each device is typically configured to execute software instructions that are stored in non-volatile memory using portions of volatile memory. Additionally or alternatively, the processor may include one or more hardware or firmware processors configured to execute hardware or firmware instructions. Processors used by the devices described herein may be single-core or multi-core, and the instructions executed thereon may be configured for sequential, parallel, and/or distributed processing. Individual components of the processor optionally may be distributed among two or more separate devices, which may be remotely located and/or configured for coordinated processing. Aspects of the processor may be virtualized and executed by remotely accessible, networked computing devices configured in a cloud-computing configuration.

Non-volatile memory is configured to hold software instructions even when power is cut to the device, and may include optical memory (e.g., CD, DVD, HD-DVD, Blu-Ray Disc, etc.), solid state memory (e.g., EPROM, EEPROM, FLASH memory, etc.), and/or magnetic memory (e.g., hard-disk drive, floppy-disk drive, tape drive, MRAM, etc.), among others. Volatile memory is configured to hold software instructions and data temporarily during execution of programs by the processor, and typically such data is lost when power is cut to the device. Examples of volatile memory that may be used include RAM, DRAM, etc.

Aspects of processor, non-volatile memory, and volatile memory may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing device 10 implemented to perform a particular function. In some cases, a module, program, or engine may be instantiated via a processor executing instructions stored in non-volatile memory using portions of volatile memory at execution time. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. The term module may also designate hardware in some cases, and when used in this context the description will clearly indicate whether that a module is hardware.

Each computing device may include an associated display, which may be used to present a visual representation of data computed and output by the processor. This visual representation may take the form of a graphical user interface (GUI). Such display devices may be combined with processor, volatile memory, and non-volatile memory in a shared enclosure, or such display devices may be peripheral display devices. Touch screens may be utilized that function both as a display and as an input device.

Each computing device may include a user input device such as a keyboard, mouse, touch pad, touch screen, microphone or game controller.

Each computing device may include a communication subsystem configured to communicatively couple the computing device with one or more other computing devices. The communication subsystem may include wired and/or wireless communication devices compatible with one or more different communication protocols. As non-limiting examples, the communication subsystem may be configured for communication via a wireless telephone or data network, or a wired or wireless local- or wide-area network. In some embodiments, the communication subsystem may allow the computing device to send and/or receive messages to and/or from other devices via a network such as the Internet.

Another example provides a computing device comprising a processor configured to compute a first feature distance between registered image data of a human face in a first spectral region and test image data of the human face in the first spectral region, compute a second feature distance between the registered image data of the human face in the first spectral region and test image data of the human face in a second spectral region, compute a test feature distance between the test image data of the human face in the first spectral region and the test image data of the human face in the second spectral region, determine, based on a predetermined relationship differentiating between real human face image data and spoofed human face image data, whether the human face to which the test image data in the first and second spectral regions corresponds is a real human face or a spoofed human face, and modify a behavior of the computing device based on whether the human face is determined to be the real human face or the spoofed human face. In such an example, the predetermined relationship alternatively or additionally may be determined by training a classifier to differentiate between real human face image data and spoofed human face image data classes in a two-dimensional feature distance space. In such an example, a first axis of the two-dimensional feature distance space alternatively or additionally may plot a range of test feature distances. In such an example, a second axis of the two-dimensional feature space alternatively or additionally may plot a range of differences between corresponding pairs of first and second feature distances. In such an example, the predetermined relationship alternatively or additionally may compare a linear combination of the first, second, and test feature distances to a threshold. In such an example, the classifier alternatively or additionally may be configured to determine that the human face is a real human face when the comparison exceeds the threshold, and to determine that the human face is a spoofed human face when the comparison falls below the threshold. In such an example, each feature distance alternatively or additionally may be computed as a likelihood ratio of a probability of a respective pair of feature vectors belonging to the real human face and a probability of the respective pair of feature vectors belonging to the spoofed human face. In such an example, the feature vectors alternatively or additionally may be computed based on local binary pattern analysis. In such an example, the first spectral region alternatively or additionally may be an infrared spectral region. In such an example, the second spectral region alternatively or additionally may be a visible spectral region. In such an example, it alternatively or additionally may be determined that the human face to which the test image data in the first and second spectral regions corresponds is the real human face when the test feature distance exceeds a threshold. In such an example, it alternatively or additionally may be determined that the human face to which the test image data in the first and second spectral regions corresponds is the real human face when the second feature distance exceeds the first feature distance. In such an example, computing the first, second, and test feature distances alternatively or additionally may include computing a respective pair of feature vectors, each feature vector encoding, for corresponding image data, one or more of a histogram of texture values, an edge, a point, a shape, and a brightness. Any or all of the above-described examples may be combined in any suitable manner in various implementations.

Another example provides a method of biometric verification comprising computing a first feature distance between registered image data of a human face in a first spectral region and test image data of the human face in the first spectral region, computing a second feature distance between the registered image data of the human face in the first spectral region and test image data of the human face in a second spectral region, computing a test feature distance between the test image data of the human face in the first spectral region and the test image data of the human face in the second spectral region, determining, based on a predetermined relationship differentiating between real human image data and spoofed human image data, whether the human face to which the test image data in the first and second spectral regions corresponds is a real human face or a spoofed human face, and modifying a behavior of a computing device based on whether the human face is determined to be the real human face or the spoofed human face. In such an example, the predetermined relationship alternatively or additionally may be determined by training a classifier to differentiate between real human face image data and spoofed human face image data classes in a two-dimensional feature distance space. In such an example, a first axis of the two-dimensional feature distance space alternatively or additionally may plot a range of test feature distances. In such an example, a second axis of the two-dimensional feature space alternatively or additionally may plot a range of differences between corresponding pairs of first and second feature distances. In such an example, the predetermined relationship alternatively or additionally may compare a linear combination of the first, second, and test feature distances to a threshold. In such an example, the classifier alternatively or additionally may be configured to determine that the human face is a real human face when the comparison exceeds the threshold, and to determine that the human face is a spoofed human face when the comparison falls below the threshold. In such an example, each feature distance alternatively or additionally may be computed as a likelihood ratio of a probability of a respective pair of feature vectors belonging to the real human face and a probability of the respective pair of feature vectors belonging to the spoofed human face. In such an example, the feature vectors alternatively or additionally may be computed based on local binary pattern analysis. In such an example, the first spectral region alternatively or additionally may be an infrared spectral region. In such an example, the second spectral region alternatively or additionally may be a visible spectral region. In such an example, it alternatively or additionally may be determined that the human face to which the test image data in the first and second spectral regions corresponds is the real human face when the test feature distance exceeds a threshold. In such an example, it alternatively or additionally may be determined that the human face to which the test image data in the first and second spectral regions corresponds is the real human face when the second feature distance exceeds the first feature distance. Any or all of the above-described examples may be combined in any suitable manner in various implementations.

Another example provides a computing device comprising a processor and memory holding instructions executable by the processor to receive registered image data of a human face in a first spectral region, receive test image data of the human face in the first spectral region, receive test image data of the human face in a second spectral region, for each of the registered image data, the test image data in the first spectral region, and the test image data in the second spectral region, identify a plurality of regions of interest, extract at least one feature from each of the plurality of regions of interest, and assemble the extracted features into a feature vector. In such an example, the instructions alternatively or additionally may be executable to compute a first feature distance between the feature vector of the registered image data and the feature vector of the test image data in the first spectral region, compute a second feature distance between the feature vector of the registered image data and the feature vector of the test image data in the second spectral region, compute a test feature distance between the feature vector of the test image data in the first spectral region and the feature vector of the test image data in the second spectral region, in a two-dimensional feature distance space, separate the first, second, and test feature distances into one of a real human face image data class and a spoofed human face image data class, and derive a classifier from the separated feature distances, the classifier configured to differentiate between real human face image data and spoofed human face image data. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. A computing device, comprising:
a processor configured to:
   compute a first feature distance between registered image data of a human face in a first spectral region and test image data of the human face in the first spectral region;
   compute a second feature distance between the registered image data of the human face in the first spectral region and test image data of the human face in a second spectral region;

compute a test feature distance between the test image data of the human face in the first spectral region and the test image data of the human face in the second spectral region;

determine, based on a predetermined relationship differentiating between real human face image data and spoofed human face image data, whether the human face to which the test image data in the first and second spectral regions corresponds is a real human face or a spoofed human face; and modify a behavior of the computing device based on whether the human face is determined to be the real human face or the spoofed human face.

2. The computing device of claim 1, wherein the predetermined relationship is determined by training a classifier to differentiate between real human face image data and spoofed human face image data classes in a two-dimensional feature distance space.

3. The computing device of claim 2, wherein a first axis of the two-dimensional feature distance space plots a range of test feature distances, and wherein a second axis of the two-dimensional feature space plots a range of differences between corresponding pairs of first and second feature distances.

4. The computing device of claim 2, wherein the predetermined relationship compares a linear combination of the first, second, and test feature distances to a threshold, and wherein the classifier is configured to determine that the human face is a real human face when the comparison exceeds the threshold, and to determine that the human face is a spoofed human face when the comparison falls below the threshold.

5. The computing device of claim 1, wherein each feature distance is computed as a likelihood ratio of a probability of a respective pair of feature vectors belonging to the real human face and a probability of the respective pair of feature vectors belonging to the spoofed human face.

6. The computing device of claim 5, wherein the feature vectors are computed based on local binary pattern analysis.

7. The computing device of claim 1, wherein the first spectral region is an infrared spectral region, and wherein the second spectral region is a visible spectral region.

8. The computing device of claim 1, wherein it is determined that the human face to which the test image data in the first and second spectral regions corresponds is the real human face when the test feature distance exceeds a threshold.

9. The computing device of claim 1, wherein it is determined that the human face to which the test image data in the first and second spectral regions corresponds is the real human face when the second feature distance exceeds the first feature distance.

10. The computing device of claim 1, wherein computing the first, second, and test feature distances includes computing a respective pair of feature vectors, each feature vector encoding, for corresponding image data, one or more of a histogram of texture values, an edge, a point, a shape, and a brightness.

11. A method of biometric verification, comprising:
computing a first feature distance between registered image data of a human face in a first spectral region and test image data of the human face in the first spectral region;

computing a second feature distance between the registered image data of the human face in the first spectral region and test image data of the human face in a second spectral region;

computing a test feature distance between the test image data of the human face in the first spectral region and the test image data of the human face in the second spectral region;

determining, based on a predetermined relationship differentiating between real human image data and spoofed human image data, whether the human face to which the test image data in the first and second spectral regions corresponds is a real human face or a spoofed human face; and modifying a behavior of a computing device based on whether the human face is determined to be the real human face or the spoofed human face.

12. The method of claim 11, wherein the predetermined relationship is determined by training a classifier to differentiate between real human face image data and spoofed human face image data classes in a two-dimensional feature distance space.

13. The method of claim 12, wherein a first axis of the two-dimensional feature distance space plots a range of test feature distances, and wherein a second axis of the two-dimensional feature space plots a range of differences between corresponding pairs of first and second feature distances.

14. The method of claim 12, wherein the predetermined relationship compares a linear combination of the first, second, and test feature distances to a threshold, and wherein the classifier is configured to determine that the human face is a real human face when the comparison exceeds the threshold, and to determine that the human face is a spoofed human face when the comparison falls below the threshold.

15. The method of claim 11, wherein each feature distance is computed as a likelihood ratio of a probability of a respective pair of feature vectors belonging to the real human face and a probability of the respective pair of feature vectors belonging to the spoofed human face.

16. The method of claim 15, wherein the feature vectors are computed based on local binary pattern analysis.

17. The method of claim 11, wherein the first spectral region is an infrared spectral region, and wherein the second spectral region is a visible spectral region.

18. The method of claim 11, wherein it is determined that the human face to which the test image data in the first and second spectral regions corresponds is the real human face when the test feature distance exceeds a threshold.

19. The method of claim 11, wherein it is determined that the human face to which the test image data in the first and second spectral regions corresponds is the real human face when the second feature distance exceeds the first feature distance.

20. A computing device, comprising:
a processor; and
memory holding instructions executable by the processor to:
receive registered image data of a human face in a first spectral region;
receive test image data of the human face in the first spectral region;
receive test image data of the human face in a second spectral region;

for each of the registered image data, the test image data in the first spectral region, and the test image data in the second spectral region:
  identify a plurality of regions of interest;
  extract at least one feature from each of the plurality of regions of interest; and
  assemble the extracted features into a feature vector;

compute a first feature distance between the feature vector of the registered image data and the feature vector of the test image data in the first spectral region;

compute a second feature distance between the feature vector of the registered image data and the feature vector of the test image data in the second spectral region;

compute a test feature distance between the feature vector of the test image data in the first spectral region and the feature vector of the test image data in the second spectral region;

in a two-dimensional feature distance space, separate the first, second, and test feature distances into one of a real human face image data class and a spoofed human face image data class; and derive a classifier from the separated feature distances, the classifier configured to differentiate between real human face image data and spoofed human face image data.

\* \* \* \* \*